United States Patent [19]

Gibson

[11] 4,408,842

[45] Oct. 11, 1983

[54] TELESCOPIC SIGHT HAVING LENS HOLDER TUBE WITH HALF SOCKET PIVOT MOUNT

[75] Inventor: Dale E. Gibson, Salem, Oreg.

[73] Assignee: Leupold & Stevens, Inc., Beaverton, Oreg.

[21] Appl. No.: 309,826

[22] Filed: Oct. 8, 1981

[51] Int. Cl.³ .................................. G02B 27/32
[52] U.S. Cl. ......................... 350/560; 350/562
[58] Field of Search ............ 350/560, 561, 562, 565, 350/566, 570, 573, 576

[56] References Cited

U.S. PATENT DOCUMENTS

| | | | |
|---|---|---|---|
| 2,858,732 | 11/1958 | Kollmorgen et al. | 88/32 |
| 2,948,188 | 8/1960 | Kollmorgen | 88/32 |
| 2,949,816 | 8/1960 | Weaver | 88/32 |
| 2,955,512 | 10/1960 | Kollmorgen et al. | 88/32 |
| 2,997,916 | 8/1961 | Friedman et al. | 88/32 |
| 3,184,852 | 5/1965 | Hageman | 350/562 X |
| 3,213,539 | 10/1965 | Burris | 33/50 |
| 3,297,389 | 1/1967 | Gibson | 350/10 |
| 3,336,831 | 8/1967 | Unertl | 88/1 |
| 3,464,758 | 9/1969 | Giwosky | 350/10 |
| 3,506,330 | 4/1970 | Allen | 350/10 |
| 3,684,376 | 8/1972 | Lessard | 350/562 |
| 3,902,251 | 9/1975 | Ross | 33/246 |
| 3,918,791 | 11/1975 | Perry | 350/42 |
| 4,200,355 | 4/1980 | Williams | 350/10 |
| 4,255,013 | 3/1981 | Allen | 350/10 |

FOREIGN PATENT DOCUMENTS 1013090 8/1957 Fed. Rep. of Germany.
1503152 10/1967 France.

Primary Examiner—John K. Corbin
Assistant Examiner—Matthew W. Koren
Attorney, Agent, or Firm—Klarquist, Sparkman, Campbell, Leigh, Whinston & Dellett

[57] ABSTRACT

A telescopic sight apparatus is described having a lens holder tube which is pivotally mounted at one end thereof by means of an improved half socket pivot means for windage and elevation adjustments. The telescopic sight apparatus may be a rifle scope. The lens holder tube contains image erector lenses which may be mounted for longitudinal adjustment to vary the magnification of the scope or may be fixed against longitudinal movement to provide fixed magnification. The half socket pivot mount includes a spherical pivot surface provided on one end of the lens holder tube which is resiliently urged by a socket compression spring into contact with a conical socket surface provided by an internal shoulder on a surrounding housing tube. The radius of curvature of the spherical pivot surface is centered on the sight point of a reticle when such reticle is mounted outside of the lens holder tube, to maintain the sight point alignment with the optical axis of such lenses in different pivot positions of the lens holder tube, so that the reticle remains centered in the field of view of the erector lenses. In the variable magnification scope the reticle is maintained at a calibration position in focus for both the maximum and minimum magnification positions of the erector lenses by means of a calibration adjustment spring. In the fixed magnification embodiment of the scope the reticle is mounted in the focal plane of the eyepiece lens system, while in the variable magnification scope, such reticle may be mounted in such calibration position slightly out of alignment with such focal plane.

20 Claims, 5 Drawing Figures

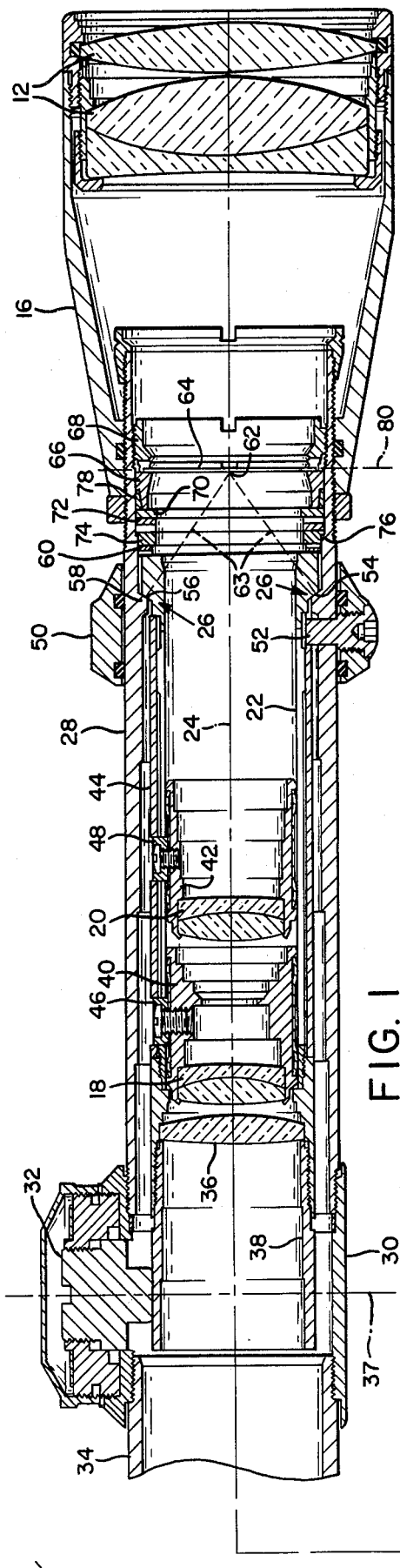
FIG. 1
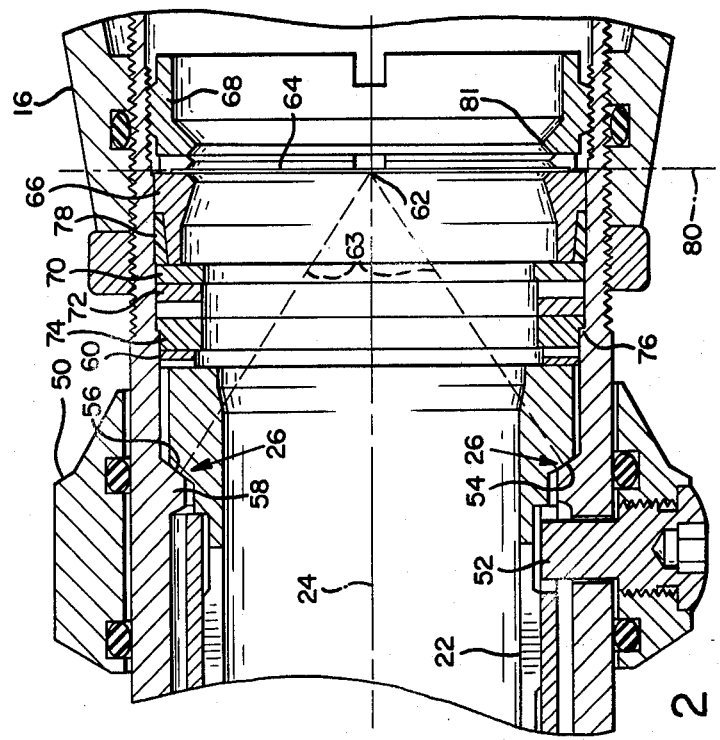
FIG. 2
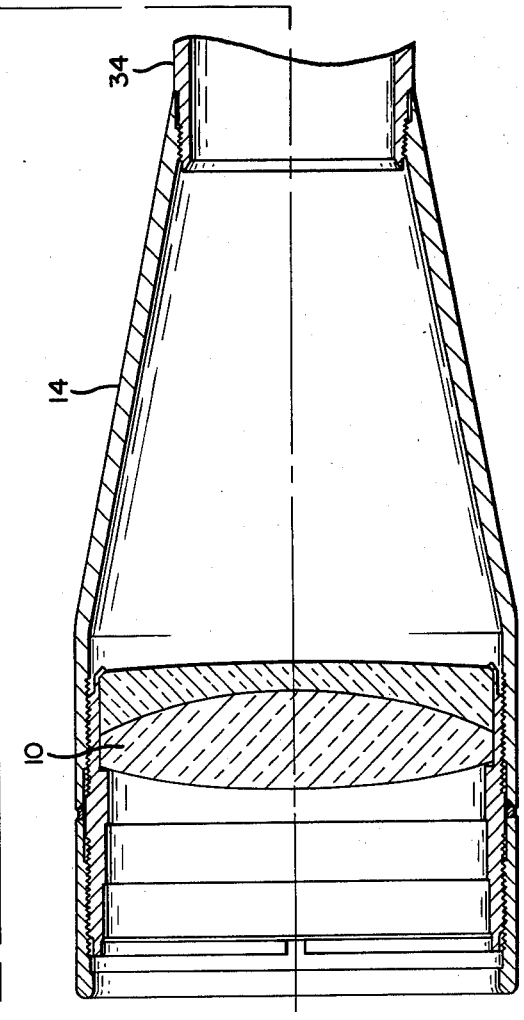

TELESCOPIC SIGHT HAVING LENS HOLDER TUBE WITH HALF SOCKET PIVOT MOUNT

BACKGROUND OF INVENTION

The subject matter of the present invention relates generally to telescopic sights for optical instruments, and in particular, to a telescopic sight apparatus having a lens holder tube pivotally mounted on a half socket pivot means for limited universal adjustment of such tube. The present telescopic sight apparatus preferably includes a lens holder tube containing image erector lenses aligned on an optical axis and which is mounted on a half socket pivot means at the rear end of such tube with a spherical pivot surface. The spherical pivot surface has its center of curvature coincident with the sight point of a reticle on the erector lens system axis when such reticle is mounted outside the lens holder tube, in order to maintain such reticle sight point centered on such axis in different pivot positions of the lens holder tube. Such telescopic sight apparatus is especially useful as a rifle scope, but can also be employed in other optical instruments such as a surveying instrument.

It has previously been proposed to provide a rifle scope of variable power magnification with a pivotally mounted lens holder tube containing longitudinally adjustable erector lenses and a fixed reticle mounted within such lens holder tube adjacent a pivot means at the rear end of such tube, as shown in U.S. Pat. No. 3,161,716 of Burris et al., issued Dec. 15, 1964. This patent discusses the problems of providing a rifle scope with a reticle which is maintained centered on the target image transmitted through the erector lenses in different positions of the lens holder tube. In order to solve this problem, such rifle scope mounts the reticle within the lens holder tube and with its sight point in alignment with the erector lens axis so that such reticle moves with the tube during pivoting adjustments of such tube to compensate for changes in windage and target range elevation. However, such rifle scope employs, as the pivot means, an elastic coupling, such as a rubber ring member, which is bonded between the end of the lens holder tube and the surrounding housing to provide limited universal movement of the lens holder tube about a pivot center which changes in position because of the nature of such elastic coupling. Such elastic coupling pivot means is, also, discussed in U.S. Pat. No. 2,948,188 of Kollmorgan, issued Aug. 9, 1960 and U.S. Pat. No. 4,200,355 of Williams, issued Apr. 29, 1980. The elastic coupling pivot means has the additional disadvantage that it enables relative movement of the erector lens tube holder with respect to the scope housing during rifle recoil which can damage the reticle and the erector lenses including their mounts.

It has previously been proposed in U.S. Pat. No. 2,858,732 of Kollmorgen et al, issued Nov. 4, 1958 and U.S. Pat. No. 2,955,512 of Kollmorgen et al., issued Oct. 11, 1960 to provide a rifle scope with an erector lens holder tube which is mounted by a half socket pivot means to enable windage and range elevation adjustments. However, the pivot means was provided by an annular flange on the rear end of the lens holder tube which is subject to binding because it is not provided with a spherical pivot surface. Also, such half socket pivot means do not position such pivot surface so that its center of curvature is coincident with the sight point of the reticle to maintain such reticle centered on the erector lens axis in the manner of the present invention. Instead, in such prior patents the reticle is fixed inside the front end of the lens holder tube, apparently in alignment with the objective lens focal plane, which has the disadvantage that any magnification of the objective image by the erector lenses also magnifies the reticle image so it obscures a larger portion of the transmitted target image.

Rifle scopes with full ball and socket pivot means for the erector lens tube have previously been proposed as shown in my earlier U.S. Pat. No. 3,297,389 of Gibson, issued Jan. 10, 1967 and U.S. Pat. No. 3,918,791 of Perry, issued Nov. 11, 1975. However, full ball and socket pivot means having a spherical pivot surface employ no socket spring to hold the pivot assembly together which would absorb rifle recoil and enable easier adjustment of the erector lens holder tube for windage and range elevation corrections. Also, assembly of the full ball and socket pivot is more difficult than the half socket pivot because the former requires the use of key projections and keyway slots to hold the spherical pivot in the socket. In addition, in neither of these patents is the reticle mounted outside of the lens holder tube and located at the center of curvature of the spherical pivot surface, as in the preferred embodiment of the present invention to maintain the sight point centered on the optical axis of the erector lens system.

It has previously been proposed to provide a rifle scope with an erector lens tube which is pivotally mounted at the rear end thereof adjacent to a fixed reticle positioned outside of such tube as shown in U.S. Pat. No. 2,949,816 of Weaver, issued Aug. 23, 1960. However, unlike the present invention, this patent does not employ a half socket pivot means with a spherical pivot surface whose center of curvature is coincident with sight point of the reticle. As a result, the reticle is not maintained in a centered position with respect to the optical axis of the erector lenses in different adjustment pivot positions of the lens tube in such prior rifle scope.

In addition, the reticle is not resiliently mounted by means of a calibration spring to enable the reticle to be located at a calibration position which is in focus in both the maximum and minimum magnification positions of the erector lenses in a variable power scope of the Burris et al U.S. Pat. No. 3,161,716 or any of the other above-discussed patents. Therefore, the telescopic sight apparatus of the present invention further distinguishes from such patents in employing such calibration spring reticle mounting. Such calibration spring, also, absorbes rifle recoil to maintain the reticle in the calibrated position, and to prevent damage to the reticle.

The half socket pivot means of the present invention has the further advantages of reduced wear, longer lifetime and being self-centering due to the conical shape of the socket into which the spherical shaped pivot surface is urged by the socket spring. Also, by providing a substantially point contact between the conical socket surface and the spherical pivot surface, the center of the present pivot means is fixed on the erector lens axis at a point coincident with the sight point of the reticle to maintain the reticle centered.

SUMMARY OF INVENTION

It is therefore one object of the present invention to provide a telescopic sight apparatus including a lens holder tube which is mounted on an improved half socket pivot means of reduced wear, longer useful life, and more accurate pivoting which enables easier pivotal adjustment of the lens holder tube to compensate for changes in windage or target elevation when such telescopic sight apparatus is employed as a rifle scope.

Another object of the invention is to provide such an improved telescopic sight apparatus with a half socket pivot means including a spherical pivot surface held in contact with a socket surface by a socket spring for easy assembly and to permit limited universal pivoting adjustment of the lens holder tube containing the erector lens system.

An additional object of the invention is to provide such an improved telescopic sight apparatus in which the reticle is mounted outside the lens holder tube so that the sight point of such reticle coincides with the center of the radius of curvature of the spherical pivot surface of such socket means to maintain the reticle image centered on the axis of the erector lens system in different adjustment positions of the lens holder tube.

Still another object of the invention is to provide an improved telescopic sight apparatus in which the half socket pivot means is formed with a conical socket surface which is engaged by the spherical pivot surface to provide a self-centering pivot means and a more accurate pivot point.

A still further object of the invention is to provide an improved rifle scope with a half socket pivot means which enables limited universal pivoting adjustment of the lens holder tube for a long, useful life without binding, and which is easy to assemble.

A still additional object of the invention is to provide such an improved rifle scope of variable magnification in which the reticle is mounted by means of a calibration adjustment spring at a calibrated position where such reticle is in focus for all magnification settings of the scope.

DESCRIPTION OF DRAWINGS

Other objects and advantages of the present invention will be apparent from the following description of preferred embodiments thereof and from the attached drawings of which:

FIG. 1 is a section view of a variable magnification rifle scope made in accordance with the present invention;

FIG. 2 is an enlarged view of a portion of FIG. 1 showing the half socket pivot means and reticle mounting means of the present invention;

DESCRIPTION OF PREFERRED EMBODIMENTS

Figure 2A:
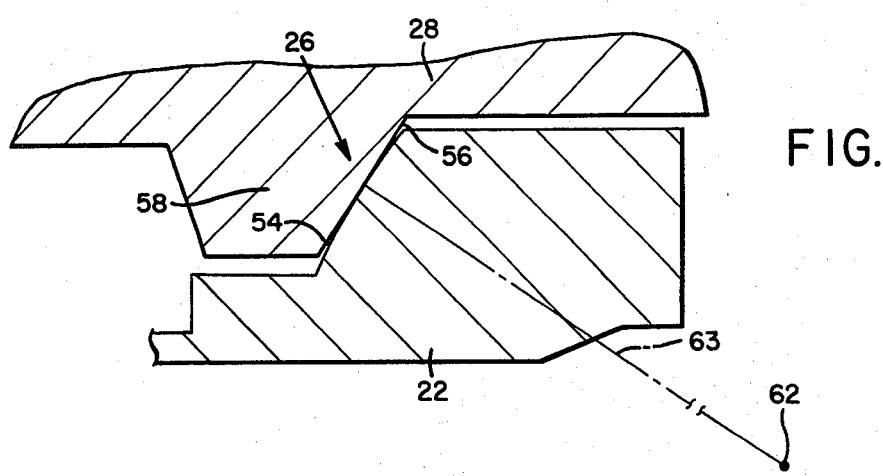
FIG. 2A is a further enlarged view of a portion of FIG. 2.

As shown in FIGS. 1 and 2, a variable magnification telescopic sight apparatus for a firearm, such as a rifle scope, made in accordance with the present invention includes an objective lens system 10 and an ocular or eyepiece lens system 12 which are supported within an objective housing shell 14 and an eyepiece housing shell 16, respectively. An image erector lens system including a first erector lens 18 and a second erector lens 20 are supported between the objective lens and eyepiece lens within a lens holder tube 22 with the centers of such erector lenses aligned along an optical axis 24 extending axially through such tube. The lens holder tube 22 is pivotally mounted by a half socket pivot means 26 at the rear end of such tube within a rear housing tube 28. The rear end of the rear housing tube 28 is threadedly connected to the eyepiece housing shell 16 while the front end of such housing tube is threadedly connected to the right side of a turret housing 30.

The turret housing 30 contains two adjustment screws 32 extending at right angles to each other into engagement with the front end of the lens housing tube 22 in order to pivotally adjust such tube vertically and horizontally in two mutually perpendicular directions to compensate for changes in windage and in target range elevation. A leaf spring (not shown) biases the lens housing tube 22 into contact with the windage and elevation adjustment screws 32 so that the setting of such screws causes a limited universal pivoting movement of such tube about the half socket pivot means 26 to locate the tube and the erector lenses 18 and 20 mounted therein in the desired sighting position for the particular windage and range elevation of the target being viewed by such scope. The objective housing shell 14 is threadedly connected to the front end of a front housing tube 34 whose rear end is threadedly connected into the left side of the turret housing 30.

A field lens 36 may be supported rearward of the objective lens focal plane 37 and in front of the first erector lens 18 by mounting such field lens within the lens holder tube 22 and clamping it in place by a tube extension 38 which is threaded into the front end of such lens holder tube. The field lens is mounted in a fixed position within the lens holder tube, and centered on the optical axis 24 of such tube. However, the first and second erector lenses 18 and 20 are mounted on movable lens holders 40 and 42, respectively, which can be adjusted longitudinally within the holder tube 22 by rotation of a cam tube 44 that surrounds the holder tube. The cam tube 44 is coupled to the lens holders 40 and 42 by means of cam followers 46 and 48, respectively, attached thereto by screws, such cam followers sliding within arcuate cam slots provided in the cam tube 44 during rotation of such cam tube. The cam followers also extend through a linear guide slot in the side of the lens holder tube 22 which prevents rotation of the lens holders 40 and 42 during their longitudinal movement of lenses 18 and 20 along the optical axis 22 to change the magnification of the scope. A power selector ring 50 is mounted on the exterior of the rear housing tube 28 and is coupled by a drive pin 52 through such housing tube to the cam tube 44 for rotation of such cam tube in response to rotation of such selector ring between maximum and minimum powers of magnification. In this regard, the rifle scope of FIGS. 1 and 2 is similar to that shown in U.S. Pat. No. 3,161,716 of Burris et al discussed above.

As shown in FIG. 2 the half socket pivot means 26 includes a spherical pivot surface 54 provided on an external shoulder at the rear end of the lens holder tube 22, and a conical socket surface 56 formed on the rear surface of an internal shoulder 58 on the rear housing tube 28. The conical socket surface extends at an angle of about 45 degrees with the optical axis 24. A socket spring 60 of the wave spring type resiliently urges the spherical pivot surface 54 into engagement with the conical socket surface 56 to hold the assembled half socket pivot means 26 together, and to enable easy pivoting adjustment of such pivot means for limited universal movement about the fixed pivot point 62 on the erector lens axis 24 which corresponds to the center of the radius of curvature of the spherical pivot surface 54. The radius of curvature 63 of the spherical pivot surface 54 may be about 0.717 inch. The radius of curvature 63 extending between the pivot point 62 and the line of tangency contact between the pivot surface and the conical socket surface 56, forms an angle of approximately 37 degrees with the optical axis 24 in the embodiment shown in FIGS. 1 and 2. Thus, the line of contact between the spherical pivot surface 54 and the conical socket surface 56 is an annular line of tangency extending around the conical surface concentric with the axis 24 which reduces friction and enables easier pivoting. The conical socket surface provides self-centering of the spherical pivot surface 52 to maintain the pivot point 62 centered on the axis 24 when such pivot surface is urged into contact with such socket surface by the socket spring 60. Also, the socket spring compensates for manufacturing tolerances of parts forming the pivot means 26 and allows such pivot means to be quickly assembled without any adjustment.

A reticle or sight 64 which may be formed by two intersecting wires whose intersections provides a sight point, is supported on a reticle mounting ring 66 within the rear housing tube 28. The reticle is supported in the scope of FIGS. 1 and 2 outside of the lens holder tube 22 at a position rearward of the pivot means 26 where such sight point is coincident with the pivot point 62 corresponding to the center of the radius of curvature of the spherical pivot surface 54. As a result, the reticle 64 remains centered in the field of view of the erector lenses 18 and 20 and the sight point 62 is maintained in alignment with the optical axis 24 in all pivot positions of the lens holder tube 22.

The reticle mounting ring 66 is held in compression between a locking ring 68 which is threaded inside the right end of the rear housing tube 28 into engagement with the right side of the reticle mounting ring. A thrust washer 70 is resiliently urged into engagement with the left side of the reticle mounting ring by a calibration adjustment spring 72 of the wave spring type which is provided between the thrust washer 70 and a step washer 74. The step washer has an external shoulder which engages shoulder 76 on the inner surface of the rear housing tube 28 to the right of the pivot socket shoulder 58. Such step washer also engages the socket spring 60 to compress such socket spring between the step washer and the rear end of the lens holder tube 22.

A reticle centering sleeve 78 of synthetic plastic material, such a nylon, is provided around the left end of the reticle mounting ring 66. The centering sleeve is formed of a tapered cross-section so that it is wedged between the outer surface of the reticle mounting ring 66 and the inner surface of the rear housing tube 28 when the lock ring 68 is tightened. As a result of its tapered cross-section, the centering sleeve 78 centers the reticle mounting ring 66 within the housing sleeve 28 so that the sight point of the reticle is in alignment with the optical axis 24, and preferably, coincides with the pivot point 62 at the center of the radius of curvature of the spherical pivot surface 54 of the half socket pivot means 26. While ordinarily the reticle 64 is mounted in the focal plane 80 of the eyepiece lens system 12, it may be necessary to displace the reticle from such focal plane slightly because during manufacture the reticle is adjusted to a calibration position where it is in focus during the entire range of magnification adjustments of the erector lenses 18 and 20 between the minimum and maximum magnification powers of the scope of the power selector ring 50. Longitudinal calibration adjustment of the reticle 64 is achieved by screw adjustment of the locking ring 68 to compress the calibration adjustment spring 72. It should be noted that the calibration adjustment spring 72 is a much heavier weight spring than the socket spring 60 because such calibration spring 72 must enable calibration adjustments of the reticle mounting ring 66, and provide shock absorption against rifle recoil for such reticle mounting ring. In addition, the lock ring 68 provides a diaphragm opening 81 which serves as a field stop to limit the viewing field of the eyepiece lens system 12.

Figure 3:
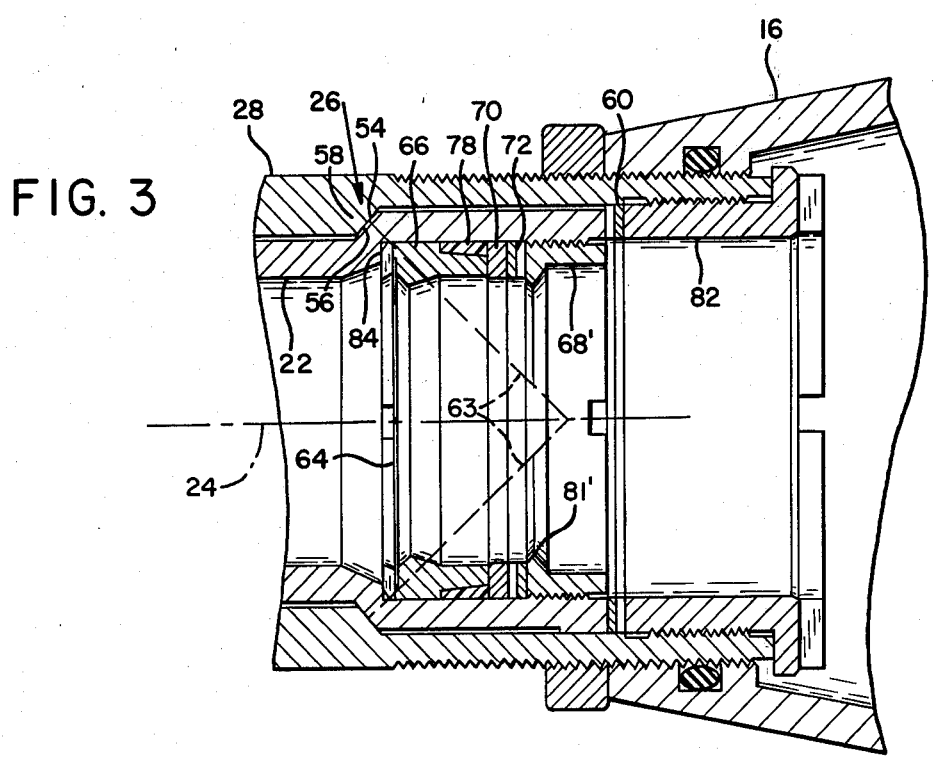
FIG. 3 is an enlarged section view of a second embodiment of the half socket pivot means and reticle mounting means which may be employed in the variable magnification scope of FIG. 1.

Another embodiment of the variable magnification rifle scope is shown in FIG. 3 to be similar to that of FIGS. 1 and 2 except that the reticle 64 is mounted within the rear end of the lens holder tube 22, not outside of such tube. The same reference numerals have been used on like parts in FIG. 3 so that only the differences between such embodiment and that of FIGS. 1 and 2 will be described. The half socket pivot means 26 is still formed by a spherical pivot surface 54 on the rear end of the lens tube 22 and a conical socket surface 56 on an internal shoulder 58 of the rear housing tube 28. However, the socket spring 60 is urged against the rear end of the lens holder tube 22 by another lock ring 82 which is threaded into the right end of the rear housing tube 28 until a stop flange on the end of such lock ring engages the end of such housing tube. Thus, the step washer 74 of FIG. 2 is eliminated, as is the internal shoulder 76 against which the step washer rests. The reticle mounting ring 66 is compressed against an internal shoulder stop 84 formed on the inner surface of the right end of the lens tube 22. The right side of the reticle mounting ring 66 is resiliently engaged by the thrust washer 70 and the calibration adjustment spring 72 is positioned between such washer and a locking ring 68' threaded into the right end of the lens holder tube 22 which clamps the assembly in the manner similar to locking ring 68 of FIG. 2.

A centering sleeve 78 is provided in FIG. 3 about the right end of the reticle mounting ring 66 for centering such mounting ring in a similar manner to FIG. 2. It should be noted that the reticle 64 is not supported so that its sight point is coincident with the pivot point 62 at the center of the radius of curvature of the spherical pivot surface 54. This is not necessary in the embodiment of FIG. 3 because the reticle 64 is mounted within the lens holder tube 22 and moves with such lens tube as it is pivoted about the half socket pivot means 26. As a result, the sight point of the reticle 64 remains centered on the optical axis 24 of the erector lenses in all pivot positions of the lens holder tube.

Figure 4:
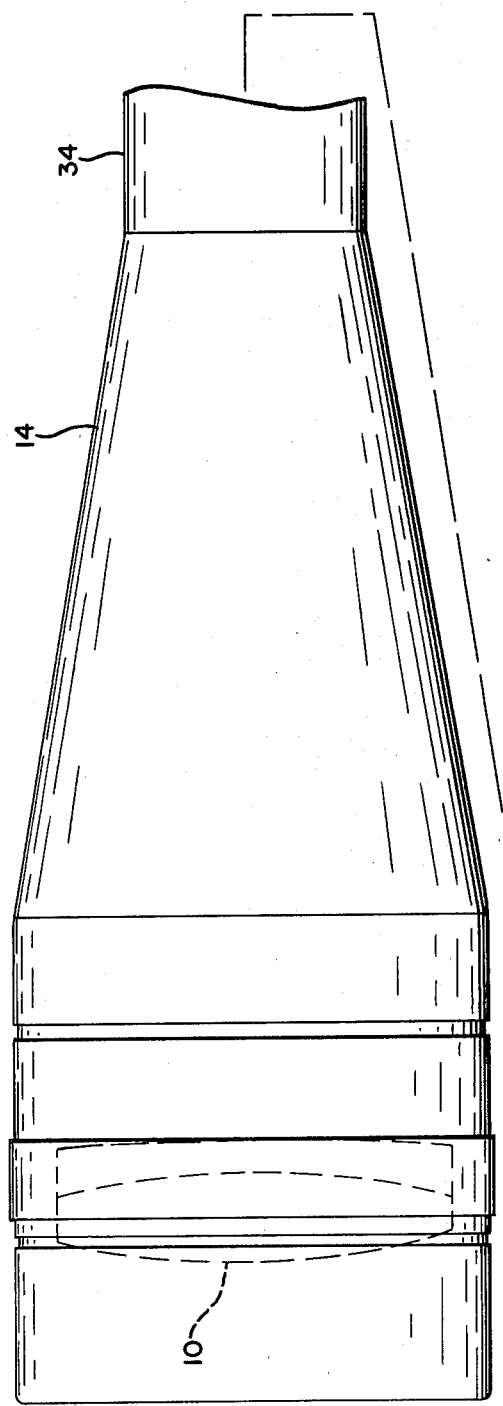
FIG. 4 is an enlarged view of a third embodiment of the half socket pivot means and reticle mounting means employed in a fixed magnification scope.
Figure 4:
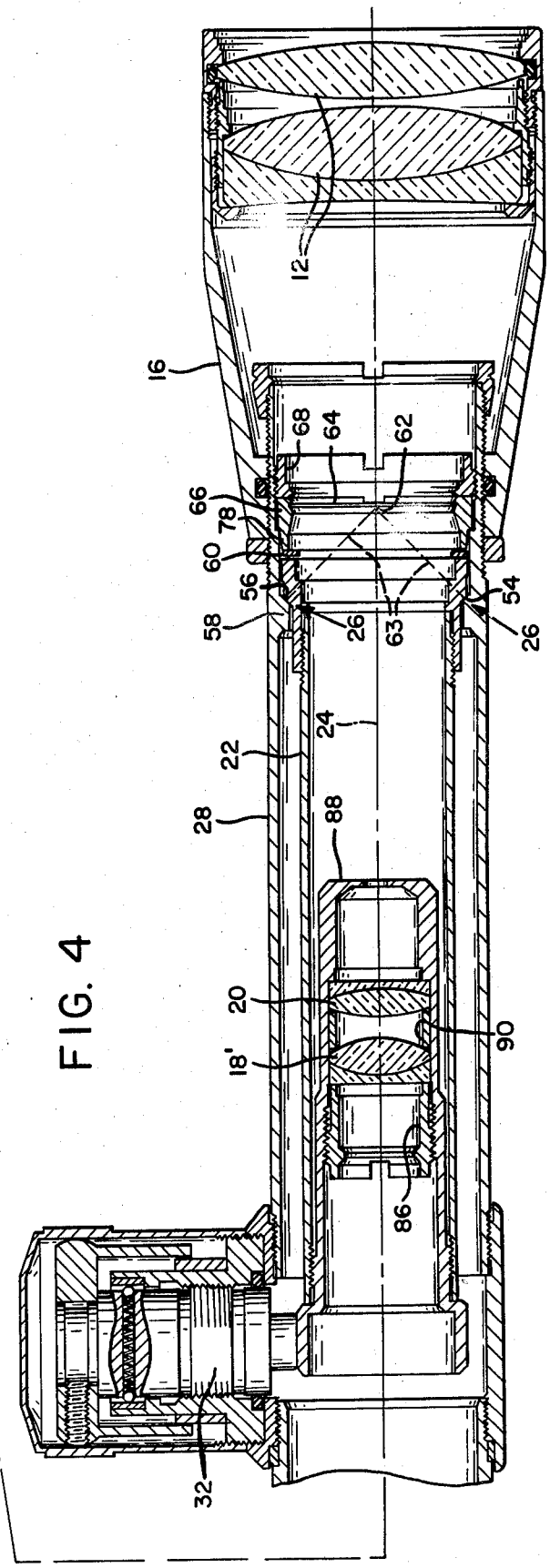

A third embodiment of the rifle scope of the present invention is shown in FIG. 4 with the same reference numbers designating like parts. This scope is of a fixed magnification so that the erector lenses 18 and 20 do not move longitudinally within the lens holder tube 22 for changing the magnification power of such scope. Instead, the erector lenses are held fixed in the position into which they are set by a lock nut ring 86 which clamps such lenses in a lens holder 88 threadedly supported within the front end of lens holder tube 22. The first erector lens 18' is spaced from the second erector lens 20 by a spacer sleeve 90 to maintain the distance between such lenses constant. Since the magnification of the scope does not change there is no need to provide a calibration adjustment for the position of the reticle 64. Therefore, the calibration adjustment spring 72, thrust washer 70 and step washer 74 of FIG. 2 are eliminated. Instead, the reticle mounting ring 66 and its centering sleeve 78 are clamped directly against the socket spring 60 by means of the lock ring 68 which engages the right side of the mounting ring 66 and is threaded into the right end of the rear housing tube 28 in a similar manner to the embodiment of FIG. 2.

The remainder of the fixed magnification scope of FIG. 4 is similar to that of the scope of FIGS. 1 and 2 so that it need not be completely described. Thus, the embodiment of FIG. 4 also includes a half socket pivot means 26 including a spherical pivot surface 54 provided on the exterior of the rear end of the lens tube holder 22 and a conical socket surface 56 provided on an internal shoulder 58 of the rear housing tube 28 which are held together by the socket spring 60. Also, the reticle 64 is positioned so that its sight point corresponds to the pivot point 62 where the center of the radius of curvature of the spherical pivot surface 54 intersects the erector lens axis 24. Thus, many of the advantages previously discussed with respect to the variable magnification scope of FIGS. 1 and 2 with respect to the use of the half socket pivot means and the mounting of the reticle with its sight point at the center of the radius of curvature of the spherical pivot surface, also, apply to the fixed magnification scope of FIG. 4.

It will be obvious to those having ordinary skill in the art that many changes may be made in the above-described preferred embodiments of the present invention. Therefore, the scope of the present invention should only be determined by the following claims.

I claim:
1. A telescopic sight apparatus, comprising:
  a lens holder tube containing lenses including at least one erector lens therein mounted in alignment along an optical axis;
  support means for supporting said tube within a housing between an objective lens system forward of the front end of said tube and an eyepiece lens system rearward of the rear end of said tube;
  pivot means for pivotally mounting the rear end portion of said tube;
  adjustment means engaging the front end portion of said tube for adjusting the position of said tube by pivoting it about said pivot means in at least two mutually perpendicular directions; and
  reticle means supported within said housing between said objective lens system and said eyepiece lens system;
  said pivot means being a half socket pivot means including a socket surface in engagement with a spherical pivot surface on said rear end portion of said tube and a socket spring for resiliently urging said pivot surface in contact with said socket surface.

2. Sight apparatus in accordance with claim 1 in which said spherical pivot surface is supported with its center of curvature coincident with the sight point of said reticle means.

3. Sight apparatus in accordance with claim 2 in which the reticle means is supported outside the lens holder tube between the rear end of said tube and said eyepiece lens system.

4. Sight apparatus in accordance with claim 1 in which said reticle sight point is positioned in the focal plane of said eyepiece lens system.

5. Sight apparatus in accordance with claim 1 in which the socket surface is of a conical shape.

6. Sight apparatus in accordance with claim 1 in which the erector lenses are fixed in said tube to prevent longitudinal movement and thereby provide fixed magnification.

7. Sight apparatus in accordance with claim 1 in which two erector lenses are supported in said tube for longitudinal adjustment to vary the magnification of said apparatus.

8. Sight apparatus in accordance with claim 7 in which the reticle means is resiliently supported for longitudinal adjustment into a calibrated position where the sight crossing is in focus for both the maximum and minimum magnification positions of said erector lenses.

9. Sight apparatus in accordance with claim 8 in which the reticle means is held in said calibrated position by an adjustment spring.

10. Sight apparatus in accordance with claim 9 in which a washer is provided between said adjustment spring and said socket spring, and said washer engages a stop shoulder on the interior of the housing to limit movement of said washer toward said pivot means.

11. Sight apparatus in accordance with claim 7 in which the erector lenses are adjusted by a cam tube surrounding the lens holder tube and connected to a magnification selector ring on the exterior of the housing for rotation of said cam tube, said cam tube having at least one cam slot which is engaged by a cam follower attached to an adjustable erector lens mount for longitudinal adjustment of the adjustable erector lens in response to rotation of said cam tube.

12. Sight apparatus in accordance with claim 11 in which the cam tube has two cam slots for movement of two erector lenses.

13. Sight apparatus in accordance with claim 1 in which the reticle means is supported in the lens holder tube with its sight point in alignment with said optical axis.

14. A rifle scope, comprising:
  a lens holder tube containing lenses including at least one erector lens therein mounted in alignment along an optical axis;
  support means for supporting said tube within a housing between an objective lens system forward of the front end of said tube and an eyepiece lens system rearward of the rear end of said tube;
  pivot means for pivotally mounting the rear end portion of said tube;
  adjustment means engaging the front end portion of said tube for adjusting the position of said tube by pivoting it about said pivot means in at least two mutually perpendicular directions; and
  reticle means supported within said housing between said objective lens system and said eyepiece lens system;
  said pivot means being a half socket pivot means including a socket surface in engagement with a spherical pivot surface of said rear end portion of said tube and a socket spring for resiliently urging said pivot surface in contact with said socket surface, and said spherical pivot surface being supported with its center of curvature coincident with the sight point of said reticle means.

15. A scope in accordance with claim 14 in which the reticle means is supported outside of the lens holder tube.

16. A scope in accordance with claim 14 in which the socket surface is of a conical shape.

17. A scope in accordance with claim 14 in which at least one erector lens is supported within the lens holder tube for longitudinal movement to vary the magnification of said scope.

18. A scope in accordance with claim 17 in which the reticle means is resiliently supported for longitudinal adjustment by a calibration spring to move said reticle means into a calibrated position where the sight crossing is in focus for both the maximum and minimum magnification positions of said erector lens.

19. A scope in accordance with claim 14 in which the erector lens is fixed in said lens holder tube to prevent longitudinal movement of said lens to provide the scope with fixed magnification.

20. A scope in accordance with claim 14 in which first and second erector lenses are supported in the lens holder tube and a field lens is supported in said tube forward of the first erector lens.

* * * * *